US012591324B2

(12) United States Patent
Chang et al.

(10) Patent No.: US 12,591,324 B2
(45) Date of Patent: Mar. 31, 2026

(54) DISPLAY DEVICE

(71) Applicant: AUO Corporation, Hsinchu City (TW)

(72) Inventors: Shu-Hao Chang, Hsinchu City (TW);
Weng-Han Lin, Hsinchu City (TW);
Chih-Hao Hung, Hsinchu City (TW);
Ya-Fang Chen, Hsinchu City (TW);
Chuo-Hsian Lin, Hsinchu City (TW)

(73) Assignee: AUO CORPORATION, Hsinchu City
(TW)

( * ) Notice: Subject to any disclaimer, the term of this
patent is extended or adjusted under 35
U.S.C. 154(b) by 0 days.

(21) Appl. No.: 18/950,260

(22) Filed: Nov. 18, 2024

(65) Prior Publication Data

US 2025/0321654 A1      Oct. 16, 2025

(30) Foreign Application Priority Data

Apr. 16, 2024      (TW) ................................. 113114195

(51) Int. Cl.
| *G06F 3/0362* | (2013.01) |
| *G06F 3/039* | (2013.01) |
| *G06F 3/044* | (2006.01) |
| *H01H 19/04* | (2006.01) |
| *H01H 19/14* | (2006.01) |

(52) U.S. Cl.
CPC .......... *G06F 3/0393* (2019.05); *G06F 3/0362*
(2013.01); *G06F 3/0446* (2019.05); *H01H*
*19/04* (2013.01); *H01H 19/14* (2013.01)

(58) Field of Classification Search
CPC .... G06F 3/0393; G06F 3/0362; G06F 3/0446;
G06F 3/0412; H01H 19/04; G02F
1/13338; B60K 35/10; B60K 35/22
See application file for complete search history.

(56) References Cited

U.S. PATENT DOCUMENTS

| 6,069,552 A | * | 5/2000 | Van Zeeland | ......... G06F 3/0338 |
| | | | | 338/92 |
| 2003/0094354 A1 | * | 5/2003 | Badarneh | .............. G06F 3/0362 |
| | | | | 200/18 |
| 2016/0313816 A1 | * | 10/2016 | Krishnakumar | ...... G06F 3/0338 |
| 2018/0046318 A1 | * | 2/2018 | Aurongzeb | ......... G06F 3/04886 |

(Continued)

FOREIGN PATENT DOCUMENTS

| CN | 112771640 A | | 5/2021 | |
| CN | 113238681 A | * | 8/2021 | ........... G06F 3/0412 |

(Continued)

*Primary Examiner* — Temesghen Ghebretinsae
*Assistant Examiner* — K. Kiyabu
(74) *Attorney, Agent, or Firm* — WPAT, PC

(57) ABSTRACT

A display device includes a touch display panel and a knob.
The touch display panel includes a plurality of touch sensing
units and a plurality of pixel units. The pixel units are
configured to form a display image. The knob is disposed on
the touch display panel. The knob includes a housing, a
conductive contact pad, and a conductive ring. The conduc-
tive contact pad is disposed on a surface of the housing that
is adjacent to the touch display panel and in contact with the
touch display panel. The conductive ring is disposed on the
surface of the housing. When the housing is not pressed, the
conductive ring is separated from the touch display panel.
When the housing is pressed, the conductive ring is in
contact with the touch display panel.

16 Claims, 6 Drawing Sheets

10

(56) References Cited

U.S. PATENT DOCUMENTS

| | | | | |
|---|---|---|---|---|
| 2020/0004348 A1* | 1/2020 | Knoppert | ............. | G06F 3/0393 |
| 2020/0019263 A1* | 1/2020 | Korherr | ............... | G01D 5/3473 |
| 2020/0117288 A1* | 4/2020 | Lopez | ................... | B60K 35/80 |
| 2021/0240305 A1 | 8/2021 | Takada et al. | | |
| 2022/0413641 A1 | 12/2022 | Takabayashi et al. | | |
| 2024/0062972 A1* | 2/2024 | Hinson | ................. | H01H 19/14 |
| 2024/0126400 A1* | 4/2024 | Choi | ..................... | G06F 3/0481 |
| 2024/0345672 A1* | 10/2024 | Fujisawa | .............. | G06F 3/0393 |

FOREIGN PATENT DOCUMENTS

| | | | | | |
|---|---|---|---|---|---|
| CN | 114651223 A | | 6/2022 | | |
| CN | 109617548 B | * | 8/2022 | ........... | G06F 3/0393 |
| DE | 202023107036 U1 | * | 1/2024 | ........... | G06F 3/0362 |

* cited by examiner

DISPLAY DEVICE

CROSS-REFERENCE TO RELATED APPLICATION

This application claims priority to Taiwan Application Serial Number 113114195, filed Apr. 16, 2024, which is herein incorporated by reference.

BACKGROUND

Technical Field

The present disclosure relates to a display device. More particularly, the present disclosure relates to a touch display device.

Description of Related Art

Recently, in order to provide users with more convenient touch interfaces, many vehicle-mounted display devices are equipped with knobs that can be rotated or pressed to control the display image. However, the commonly used knobs on the vehicle-mounted display devices mostly have only a one-way pressing functionality, which significantly limits their range of applications.

Accordingly, how to provide a display device to solve the aforementioned problems becomes an important issue to be solved by those in the industry.

SUMMARY

An aspect of the disclosure is to provide a display device that may efficiently solve the aforementioned problems.

According to an embodiment of the disclosure, a display device includes a touch display panel and a knob. The touch display panel includes a plurality of touch sensing units and a plurality of pixel units. The pixel units are configured to form a display image. The knob is disposed on the touch display panel. The knob includes a housing, a conductive contact pad, and a conductive ring. The conductive contact pad is disposed on a surface of the housing that is adjacent to the touch display panel and in contact with the touch display panel. The conductive ring is disposed on the surface of the housing. When the housing is not pressed, the conductive ring is separated from the touch display panel. When the housing is pressed, the conductive ring is in contact with the touch display panel.

In an embodiment of the disclosure, when the housing is not pressed, the conductive ring is substantially parallel to the touch display panel. A gap between the conductive ring and the touch display panel is greater than or equal to about 2 mm.

In an embodiment of the disclosure, the conductive ring surrounds the conductive contact pad.

In an embodiment of the disclosure, an opening of the housing exposes a portion of the touch display panel.

In an embodiment of the disclosure, the conductive ring laterally surrounds the opening of the housing. The conductive contact pad is disposed on a side of the conductive ring adjacent to the opening of the housing.

In an embodiment of the disclosure, under a first condition, when the housing is pressed, the conductive ring is tilted relative to the touch display panel and forms a point contact with the touch display panel.

In an embodiment of the disclosure, under a second condition, when the housing is pressed, the conductive ring forms a plane contact with the touch display panel.

In an embodiment of the disclosure, the display image has different interactive effects in response to the first condition and the second condition.

In an embodiment of the disclosure, the conductive contact pad and the conductive ring include different materials.

In an embodiment of the disclosure, the conductive contact pad includes a metal material, and the conductive ring includes a conductive polymer material.

In an embodiment of the disclosure, the display device further includes a spring structure disposed between the conductive ring and the conductive contact pad.

In an embodiment of the disclosure, a portion of the conductive contact pad is embedded in a groove of the housing.

According to an embodiment of the disclosure, a display device includes a touch display panel and a knob. The touch display panel includes a plurality of touch sensing units and a plurality of pixel units. The pixel units are configured to form a display image. The knob is disposed on the touch display panel. The knob includes a housing, a conductive ring, and a conductive contact pad. The conductive ring is disposed on an outermost edge of a surface of the housing that is adjacent to the touch display panel. When the housing is not pressed, the conductive ring is separated from the touch display panel and substantially parallel to the touch display panel. When the housing is pressed, the conductive ring is in contact with the touch display panel. The conductive contact pad is embedded in a groove of the housing and in contact with the touch display panel.

In an embodiment of the disclosure, when the housing is not pressed, a gap between the conductive ring and the touch display panel is greater than or equal to about 2 mm.

In an embodiment of the disclosure, under a first condition, when the housing is pressed, the conductive ring is tilted relative to the touch display panel, and a portion of the conductive ring is in contact with the touch display panel, while a remaining portion of the conductive ring is separated from the touch display panel.

In an embodiment of the disclosure, under a second condition, when the housing is pressed, the conductive ring is in contact with the touch display panel and substantially parallel to the touch display panel.

In an embodiment of the disclosure, the display image has different interactive effects in response to the first condition and the second condition.

In an embodiment of the disclosure, the conductive contact pad and the conductive ring include different materials.

In an embodiment of the disclosure, the conductive contact pad includes a metal material, and the conductive ring includes a conductive polymer material.

In an embodiment of the disclosure, the display device further includes a spring structure disposed between the conductive ring and the conductive contact pad.

Accordingly, in the display device of some embodiments of the present disclosure, by disposing the conductive ring on the knob, users can achieve various contact modes by pressing the knob. Different contact modes create different levels of capacitance changes, resulting in different interactive effects on the display image. For example, the knob can be pressed and tilted to be partially in contact with the touch sensing panel. Also, the knob can be pressed to approach the touch sensing panel along a direction that is perpendicular to the upper surface of the touch sensing panel and form a plane contact. Under such configuration, the functions of display driving, timing control, touch sensing control, and identification of rotation of the knob can be integrated using one single driver chip without the need for additional encoders or printed circuit board assemblies. Compared with common display devices, the display device of the present disclosure can provide a wide range of applications of touch sensing while simplifying the structure and related fabrication processes.

It is to be understood that both the foregoing general description and the following detailed description are by examples and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
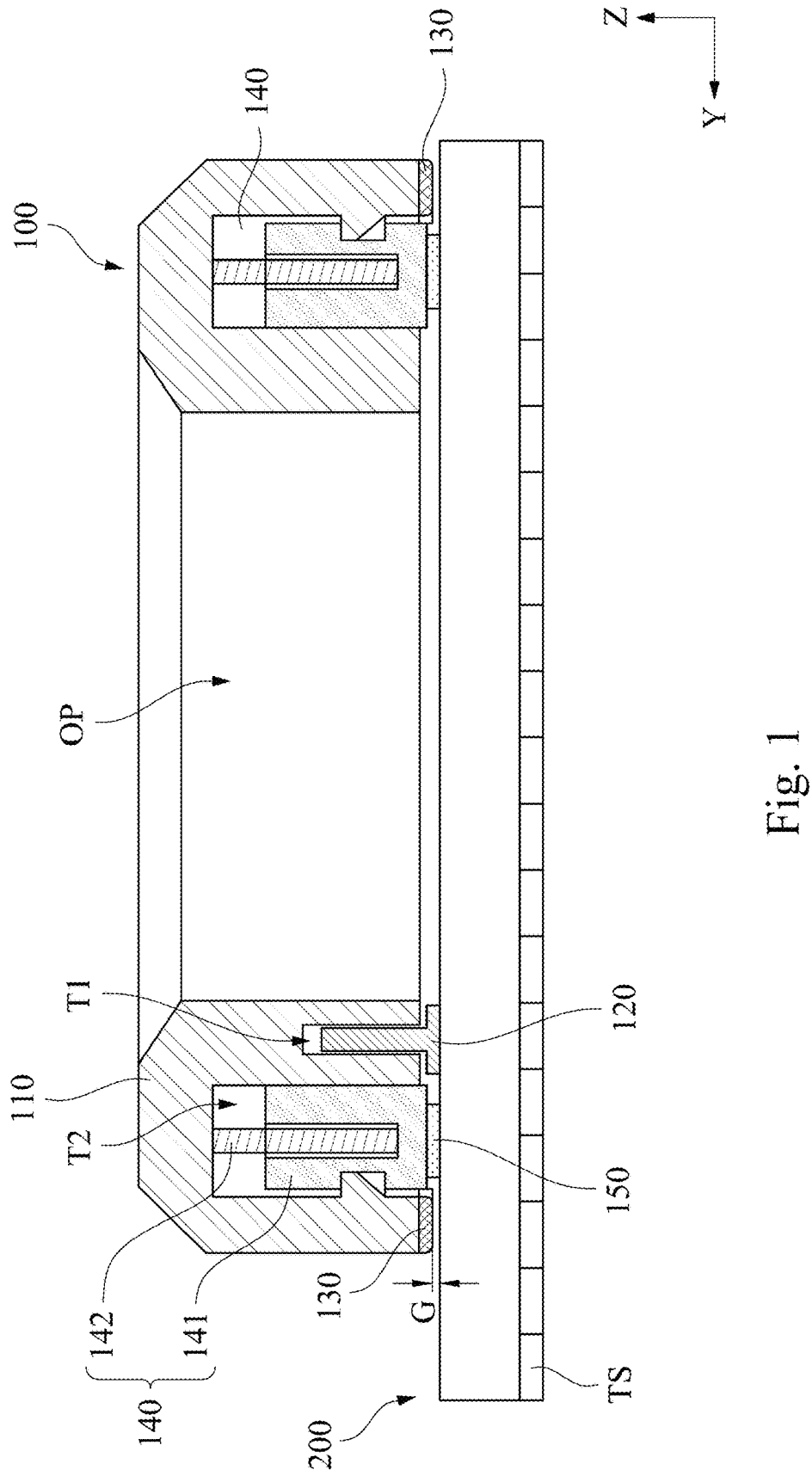
FIG. 1 is a partial cross-sectional view of a display device according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. FIG. 1 is a partial cross-sectional view of a display device 10 according to some embodiments of this disclosure. As shown in FIG. 1, the display device 10 includes a knob 100 and a touch display panel 200. The knob 100 is disposed on the touch display panel 200 and configured to form different contact modes with the touch display panel 200 under different operating conditions.

The touch display panel 200 includes a plurality of touch sensing units TS and a plurality of pixel units. The touch sensing units TS are configured to detect different touch actions and generate corresponding sensing signals based on the touch actions. For example, the touch sensing units TS are configured to detect contact from a human hand as well as contact with the knob 100. Pixel units such as liquid crystal units are configured to form a display image. In some embodiments, the touch sensing units TS and the pixel units are overlapping arrays. In other words, the touch sensing units TS and the pixel units are arranged one-to-one in a touch display area of the touch display panel 200. For the sake of simplicity, in FIG. 1, only the touch sensing units TS are shown. In some embodiments, the touch display panel 200 is an in-cell multi-touch panel.

In some embodiments, as shown in FIG. 1, the knob 100 is disposed above the touch sensing units TS. In other words, the knob 100 may be disposed above the touch display area. The knob 100 includes a housing 110, a conductive contact pad 120, and a conductive ring 130. In some embodiments, the housing 110 has an opening OP. The opening OP exposes a portion of the touch display panel 200.

As shown in FIG. 1, the conductive contact pad 120 is disposed on a surface of the housing 110 that is adjacent to the touch display panel 200. The conductive contact pad 120 is in contact with an upper surface of the touch display panel 200. In addition, as shown in FIG. 1, a portion of the conductive contact pad 120 is embedded in a groove T1 of the housing 110. In some embodiments, a spring structure or a similar elastic structure is disposed between the groove T1 and the portion of the conductive contact pad 120 that is embedded in the groove T1 so that the conductive contact pad 120 may abut against the upper surface of the touch display panel 200 under different operating conditions.

As shown in FIG. 1, the conductive ring 130 is also disposed on the surface of the housing 110 that is adjacent to the touch display panel 200. In some embodiments, the conductive ring 130 surrounds the conductive contact pad 120. In greater detail, the conductive ring 130 may laterally surround the opening OP of the housing 110, and the conductive contact pad 120 is disposed on a side of the conductive ring 130 that is adjacent to the opening OP of the housing 110.

In some embodiments, the conductive contact pad 120 and the conductive ring 130 include different materials. For example, the conductive contact pad 120 includes a metal material, and the conductive ring 130 includes a conductive polymer material, such as conductive rubber or conductive silicone.

As shown in FIG. 1, the knob 100 may further include a spring structure 140 between the conductive contact pad 120 and the conductive ring 130. The spring structure 140 includes a block body 141 and a spring 142 disposed in a groove of the housing 110 such as the groove T2 shown in FIG. 1. In some embodiments, there may be a plurality of spring structures 140 annularly arranged along the conductive ring 130. As such, when the housing 110 is pressed along a normal direction (for example, when a pressure along a direction Z is exerted), the spring structures 140 can provide a restoring force to push the housing 110 back to a preset equilibrium position, such as the position of the housing 110 shown in FIG. 1.

The knob 100 may further include an adhesive layer 150 disposed below the block body 141 to fix the knob 100 to the upper surface of the touch display panel 200. In some embodiments, the adhesive layer 150 is a colloid with a high compressibility to allow the knob 100 to tilt relative to the touch display panel 200 and become partially in contact with the touch display panel 200. In some embodiments, the adhesive layer 150 is a reusable gel, allowing the knob 100 to be repositioned and reattached onto the touch display panel 200. It should be noted that since the block body 141 is disposed in the groove T2, the housing 110 can move relative to the block body 141. Therefore, when the block body 141 is fixed to the touch display panel 200 through the adhesive layer 150, the housing 110 may still rotate relative to the block body 141 and the touch display panel 200. The operating modes of rotation of the knob 100 will be described in detail in subsequent paragraphs.

Figure 2:
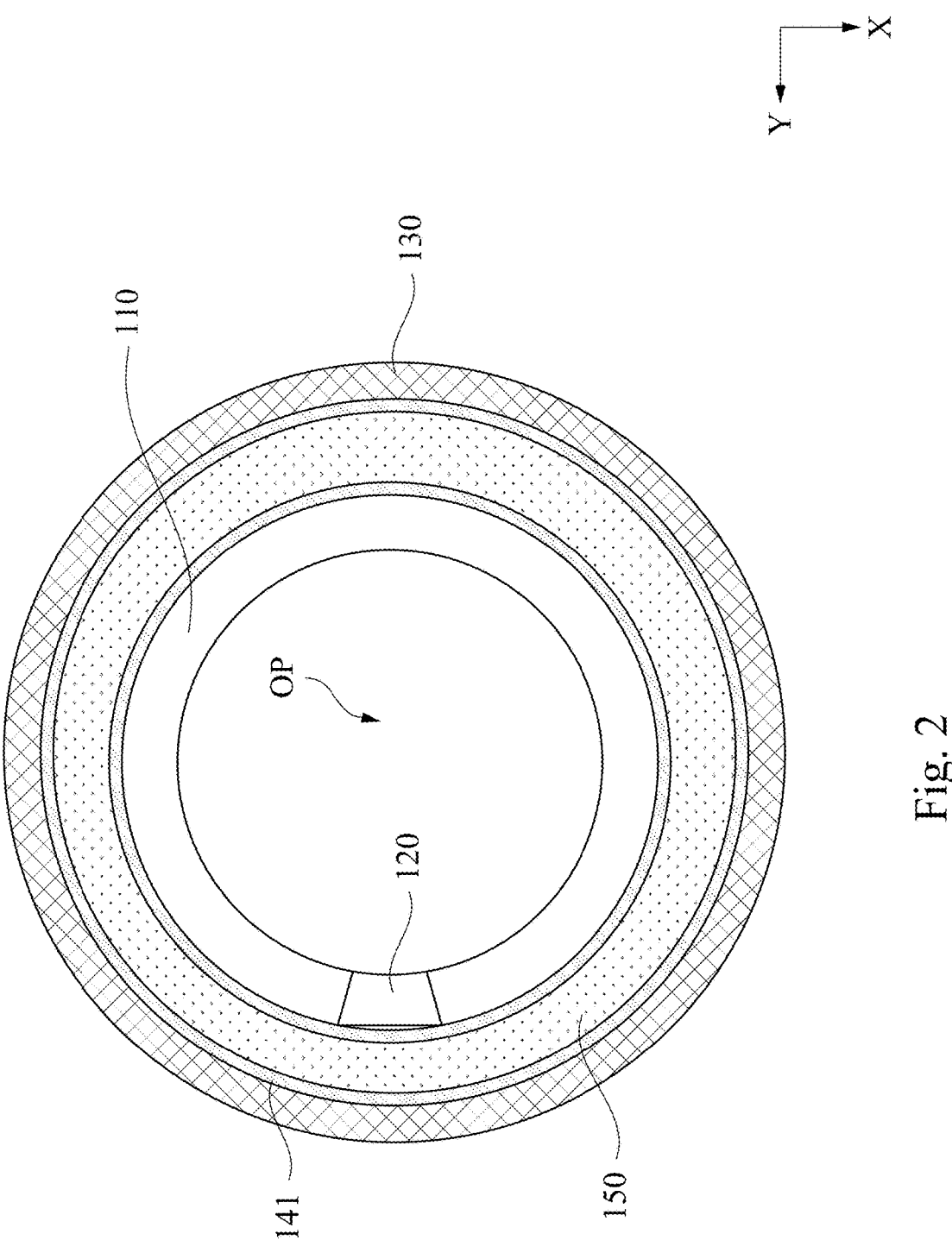
FIG. 2 is a bottom view of a knob of a display device according to some embodiments of the present disclosure.

Reference is made to FIG. 2. FIG. 2 is a bottom view of the knob 100 of the display device 10 according to some embodiments of the present disclosure. As shown in FIG. 2, the conductive ring 130 is disposed on the outermost edge of the surface of the housing 110 that is adjacent to the touch display panel 200, surrounding the conductive contact pad 120, and surrounding the opening OP of the housing 110. In some embodiments, as shown in FIG. 2, the block body 141 may be disposed in a ring shape within a groove (not shown in FIG. 2) of the housing 110. Correspondingly, a plurality of springs (not shown in FIG. 2) may be annularly arranged along the conductive ring 130 and between the block body 141 and the groove of the housing 110. The adhesive layer 150 is disposed on a surface of the block body 141.

Referring back to FIG. 1, as aforementioned, the knob 100 is configured to be in contact with the touch display panel 200 in different contact modes under different operating conditions. FIG. 1 can be referred to as the equilibrium position of the knob 100 when the knob 100 is not pressed. When the housing 110 is not pressed by an external force, the conductive ring 130 is separated from the touch display panel 200, as shown in FIG. 1. In greater detail, the conductive ring 130 is substantially parallel to the touch display panel 200. As such, there is a gap G between the conductive ring 130 and the upper surface of the touch display panel 200. The gap G is greater than or equal to about 2 mm.

Figure 3:
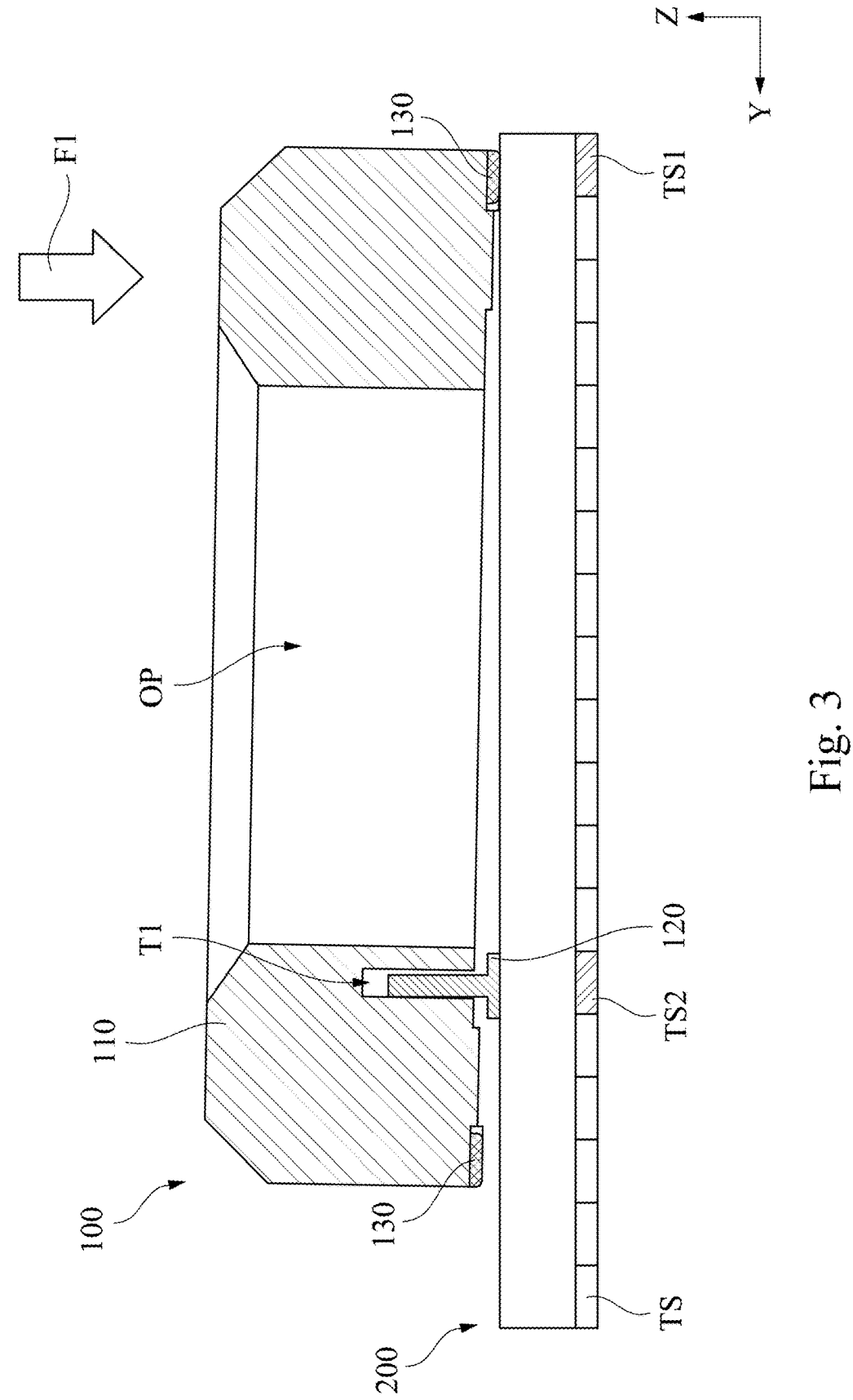
FIG. 3 is a partial cross-sectional view of a display device according to some embodiments of the present disclosure.
Figure 4:
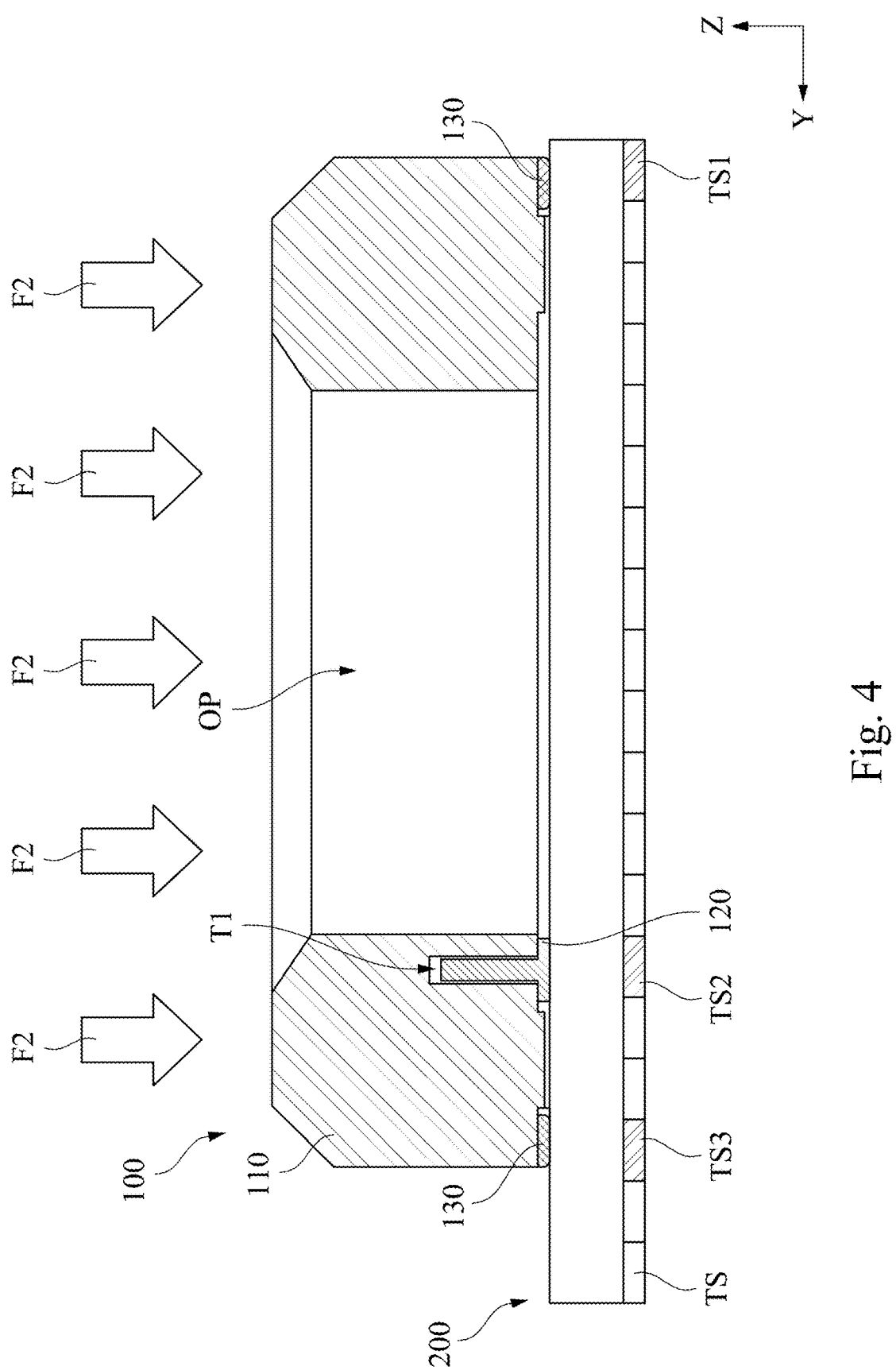
FIG. 4 is a partial cross-sectional view of a display device according to some embodiments of the present disclosure.

Next, reference is made to FIG. 3 and FIG. 4. FIG. 3 and FIG. 4 are partial cross-sectional views of the display device 10 under different operating conditions according to some embodiments of this disclosure, respectively.

First, under a first condition, the housing 110 is pressed at a single point. For example, as shown in FIG. 3, an external force F1 is applied to the right side of the housing 110, causing the conductive ring 130 to tilt relative to the touch display panel 200, and a portion of the conductive ring 130 forms a point contact with the touch display panel 200 (as shown on the right side of the conductive ring 130). In this case, the portion of the conductive ring 130 that is in contact with the touch display panel 200 is conducting and causes a capacitance change. Therefore, the touch sensing units TS (for example, the touch sensing unit TS1 shown in FIG. 3) can detect the capacitance change and generate a first sensing signal.

It should be noted that the term "point contact" used herein means that a portion of the conductive ring 130 is in contact with the touch display panel 200 and the remaining portion of the conductive ring 130 is separated from the touch display panel 200.

Next, under a second condition, the housing 110 is pressed at multiple points. For example, as shown in FIG. 4, an external force F2 is evenly applied to the housing 110, causing the housing 110 to approach the touch display panel 200 along a direction perpendicular to the upper surface of the touch display panel 200 and causing the conductive ring 130 to form a plane contact with the touch display panel 200. In this case, the portion of the conductive ring 130 that is in contact with the touch display panel 200 is conducting and causes a capacitance change. Therefore, the touch sensing units TS (such as the touch sensing unit TS1 and the touch sensing unit TS3 shown in FIG. 4) can detect the capacitance change and generate a second sensing signal.

It should be noted that the contact area of the plane contact herein is greater than the contact area of the point contact and may be several times the contact area of the point contact. In other words, the number of the touch sensing units TS triggered under the second condition is greater than the number of the touch sensing units TS triggered under the first condition.

In some embodiments, the touch display panel 200 may further include a driving unit coupled to the touch sensing units TS and the pixel units. The driving unit receives sensing signals from the touch sensing units TS and generates corresponding control signals, thereby controlling the pixel units to form different display images and create various visual outputs.

For example, after receiving the sensing signals, the driving unit can determine whether the contact mode at the moment belongs to the first condition or the second condition based on the number of the triggered touch sensing units TS. For example, when the number of the triggered touch sensing units TS is less than or equal to a threshold value (e.g., 4), it is determined that the conductive ring 130 and the touch display panel 200 form a point contact, which belongs to the first condition. When the number of the triggered touch sensing units TS is greater than or equal to another threshold value (e.g. 15), it is determined that the conductive ring 130 and the touch display panel 200 form a plane contact, which belongs to the second condition. By adjusting the threshold values for determining the contact modes, the resolution of the knob 100 for detecting different pressing directions may be adjusted. When the threshold values are smaller, the resolution of the knob 100 for detecting the pressing directions is higher. When the threshold values are greater, the resolution of the knob 100 for detecting the pressing directions is lower.

In some embodiments, the display image has different interactive effects in response to the first condition and the second condition. For example, under the first condition, the driving unit controls the touch sensing units TS to achieve a panning effect of the display image, while under the second condition, the driving unit controls the touch sensing units TS to achieve a clicking effect.

In addition, as aforementioned, the conductive contact pad 120 maintains contact with the upper surface of the touch display panel 200. Therefore, when the knob 100 is disposed onto the touch display panel 200, the portion of the conductive contact pad 120 that is in contact with the touch display panel 200 may also cause a capacitance change. Therefore, the touch sensing units TS (for example, the touch sensing unit TS2 shown in FIG. 3 and FIG. 4) can detect the capacitance change and generate a third sensing signal. The driving unit can determine whether there is a knob 100 disposed on the touch display panel 200 at the moment based on the third sensing signal and identify the position where the knob 100 is disposed. In some embodiments, the display image may also produce different display effects around the position where the knob 100 is disposed, such as displaying a menu. As aforementioned, the fixation method of the knob 100 allows the housing 110 to rotate relative to the touch display panel 200. Therefore, in some embodiments, the position of the conductive contact pad 120 can be changed by rotating the knob 100, thereby changing the display image, such as selecting menu items.

It should be noted that the conductive contact pad 120 and the conductive ring 130 are made of different conductive materials. As a result, capacitance changes caused by the conductive contact pad 120 and the conductive ring 130 are different when they are in contact with the touch display panel 200 even if their contact areas with the touch display panel 200 are the same. In turn, different sensing signals are generated by the triggered touch sensing units TS. Therefore, the driving unit can determine whether a capacitance change is caused by the conductive contact pad 120 or the conductive ring 130 based on the difference between the first sensing signal, the second sensing signal, and the third sensing signal.

Similarly, the capacitance change caused by a human touch is different from the capacitance changes caused by the conductive contact pad 120 and the conductive ring 130. Thus, the driving unit can also distinguish between a touch action caused by a human hand and a touch action caused by the knob 100. In other words, in the display device of this disclosure, operations based on touch actions of the human hands and the knob may apply at the same time through one single driving unit.

Under such configuration, the driving circuits for the touch sensing units and the pixel units can be disposed on a same side of an array substrate, thus making module function integration (including display driving, timing control, touch sensing control, and identification of rotation of the knob 100) achievable through one single driving chip. In this way, the display device 10 can include a plurality of knobs 100 disposed at different positions in the touch display area and is configured to be triggered by touch actions of the human hands and the knobs 100 at the same time, without the need for an additional encoder or a printed circuit board assembly (PCBA) to assist integration.

Figure 5:
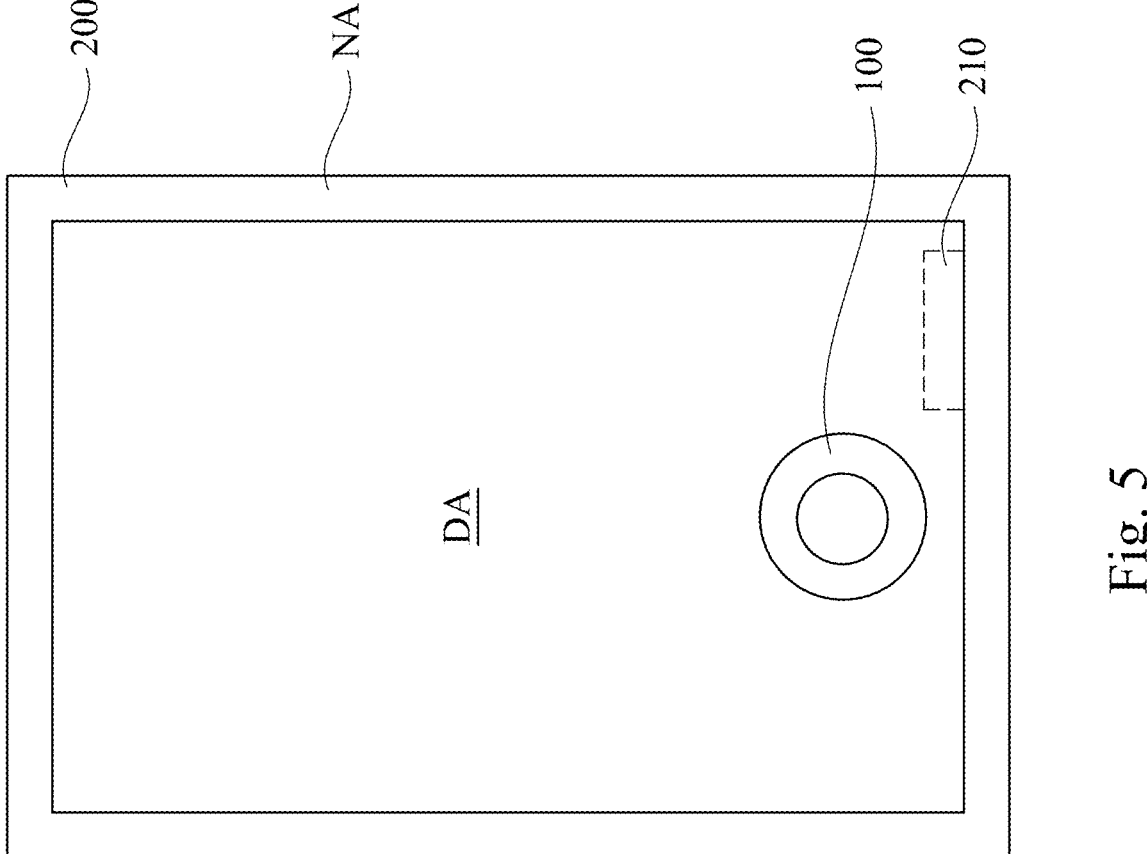
FIG. 5 is a top view of a display device according to some embodiments of the present disclosure.

Reference is made to FIG. 5. FIG. 5 is a top view of the display device 10 according to some embodiments of the present disclosure. As shown in FIG. 5, the touch display panel 200 includes a touch display area DA and a non-display area NA surrounding the touch display area DA. The touch sensing units and the pixel units are disposed in the touch display area DA (e.g., arranged in an array along a direction X and a direction Y). The knob 100 may be disposed above the touch display area DA and expose a portion of the touch display area DA through an opening of the knob 100 (such as the opening OP in FIG. 1). In other words, users can see a portion of the display image and interact with the display image via touch through the opening of the knob 100. As shown in FIG. 5, the touch display panel 200 may further include a driving unit 210. In some embodiments, the driving unit 210 may be a Touch with Display Driver (TDDI).

Figure 6:
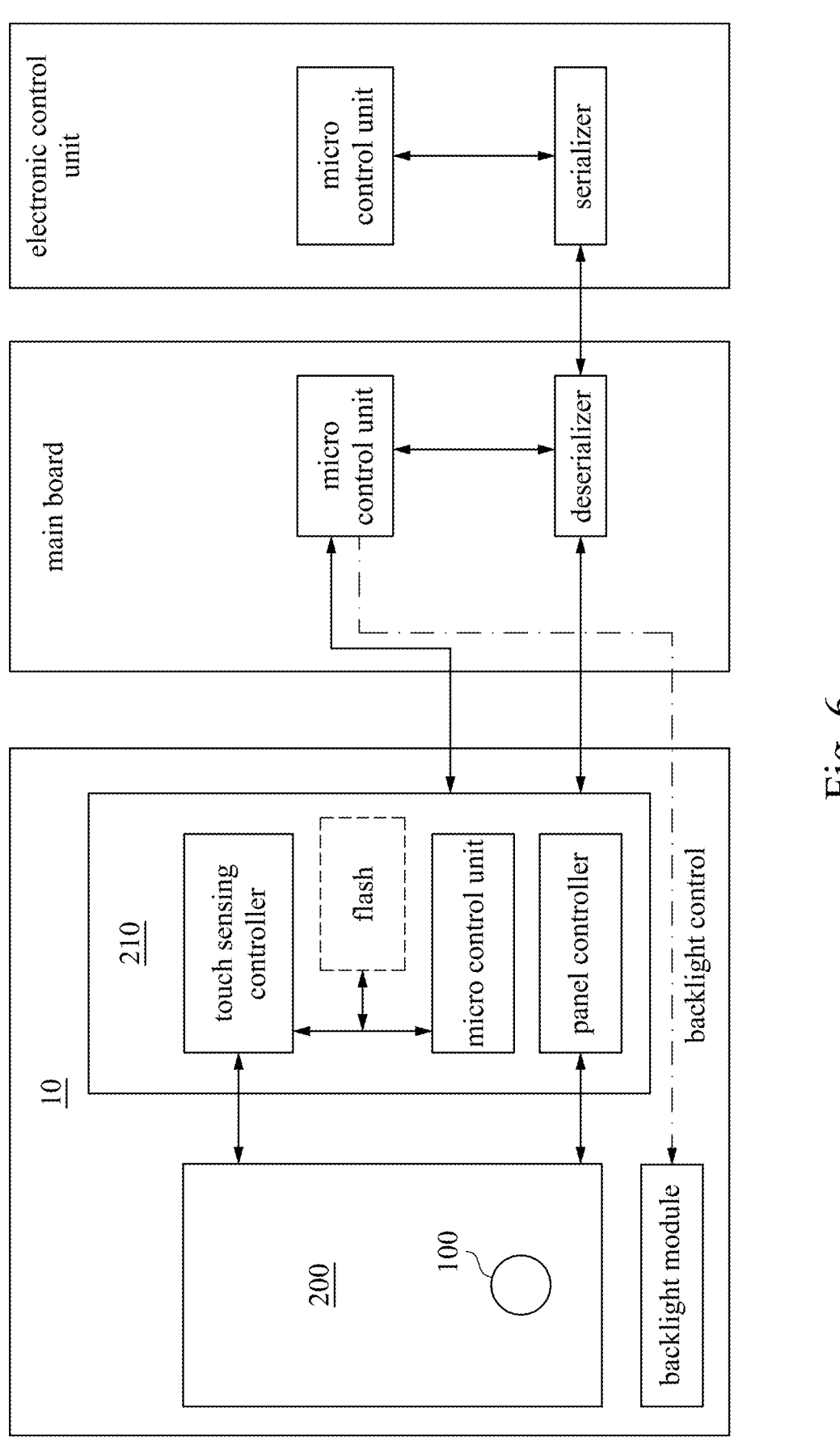
FIG. 6 is a schematic diagram of a control system of a display device according to some embodiments of the present disclosure.

Reference is made to FIG. 6. FIG. 6 is a schematic diagram of a control system of the display device 10 according to some embodiments of this disclosure. In the embodiments corresponding to FIG. 6, the display device 10 is a liquid crystal display device for vehicles. As aforementioned, the driving unit 210 of the display device 10 may be a Touch with Display Driver for integrating a touch sensing controller and a panel controller. The panel controller may further include a timing controller (T-con). In addition, the driving unit 210 may further include a micro control unit (MCU) and a flash. As aforementioned, the driving unit 210 is coupled to the touch sensing units and the pixel units of the touch display panel 200. The driving unit 210 may also be directly or indirectly coupled to an on-board computer, such as the main board and the electronic control unit (ECU) shown in FIG. 6. In this way, text or image information transmitted between the serializer of the electronic control unit and the deserializer of the main board can be sent to the display device 10 for display. Also, as shown in FIG. 6, the display device 10 may further include a backlight module directly coupled to a micro control unit of the main board.

According to the foregoing recitations of the embodiments of the disclosure, it may be seen that in the display device of some embodiments of the present disclosure, by disposing the conductive ring on the knob, users can achieve various contact modes by pressing the knob. Different contact modes create different levels of capacitance changes, resulting in different interactive effects on the display image. For example, the knob can be pressed and tilted to be partially in contact with the touch sensing panel. Also, the knob can be pressed to approach the touch sensing panel along a direction that is perpendicular to the upper surface of the touch sensing panel and form a plane contact. Under such configuration, the functions of display driving, timing control, touch sensing control, and identification of rotation of the knob can be integrated using one single driver chip without the need for additional encoders or printed circuit board assemblies. Compared with common display devices, the display device of the present disclosure can provide a wide range of applications of touch sensing while simplifying the structure and related fabrication processes.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A display device, comprising:
a touch display panel comprising a plurality of touch sensing units and a plurality of pixel units, wherein the pixel units are configured to form a display image; and
a knob disposed on the touch display panel and comprising:
a housing;
a conductive contact pad disposed on a bottommost surface of the housing that is adjacent to the touch display panel and in contact with the touch display panel, wherein a portion of the conductive contact pad is embedded in a groove of the housing;
a conductive ring disposed on an outermost edge of the bottommost surface of the housing, wherein:
when the housing is not pressed, the conductive ring is separated from the touch display panel, and
when the housing is pressed, the conductive ring is in contact with the touch display panel, wherein under a first condition, when the housing is pressed, the conductive ring is tilted relative to the touch display panel and forms a point contact with the touch display panel; and
a spring structure disposed laterally between the conductive ring and the conductive contact pad in a cross-sectional view such that under the first condition, the conductive contact pad remains in contact with the touch display panel.

2. The display device of claim 1, wherein when the housing is not pressed, the conductive ring is substantially parallel to the touch display panel, and a gap between the conductive ring and the touch display panel is greater than or equal to about 2 mm.

3. The display device of claim 1, wherein the conductive ring surrounds the conductive contact pad.

4. The display device of claim 1, wherein an opening of the housing exposes a portion of the touch display panel.

5. The display device of claim 4, wherein the conductive ring laterally surrounds the opening of the housing, and the conductive contact pad is disposed on a side of the conductive ring that is adjacent to the opening of the housing.

6. The display device of claim 1, wherein under a second condition, when the housing is pressed, the conductive ring forms a plane contact with the touch display panel.

7. The display device of claim 6, wherein the display image has different interactive effects in response to the first condition and the second condition.

8. The display device of claim 1, wherein the conductive contact pad and the conductive ring comprise different materials.

9. The display device of claim 1, wherein the conductive contact pad comprises a metal material, and the conductive ring comprises a conductive polymer material.

10. A display device, comprising:

a touch display panel comprising a plurality of touch sensing units and a plurality of pixel units, wherein the pixel units are configured to form a display image; and a knob disposed on the touch display panel and comprising:

a housing;

a conductive ring disposed on an outermost edge of a bottommost surface of the housing facing the touch display panel, wherein:

when the housing is not pressed, the conductive ring is separated from the touch display panel and substantially parallel to the touch display panel, and when the housing is pressed, the conductive ring is in contact with the touch display panel and is vertically between the bottommost surface of the housing and the touch display panel, wherein under a first condition, when the housing is pressed, the conductive ring is tilted relative to the touch display panel, and a portion of the conductive ring is in contact with the touch display panel, while a remaining portion of the conductive ring is separated from the touch display panel; and a conductive contact pad embedded in a groove of the housing and in contact with the touch display panel.

11. The display device of claim 10, wherein when the housing is not pressed, a gap between the conductive ring and the touch display panel is greater than or equal to about 2 mm.

12. The display device of claim 10, wherein under a second condition, when the housing is pressed, the conductive ring is in contact with the touch display panel and substantially parallel to the touch display panel.

13. The display device of claim 12, wherein the display image has different interactive effects in response to the first condition and the second condition.

14. The display device of claim 10, wherein the conductive contact pad and the conductive ring comprise different materials.

15. The display device of claim 10, wherein the conductive contact pad comprises a metal material, and the conductive ring comprises a conductive polymer material.

16. The display device of claim 10, further comprising a spring structure disposed between the conductive ring and the conductive contact pad.

* * * * *